(12) United States Patent
Muehlhauser

(10) Patent No.: US 11,009,471 B2
(45) Date of Patent: May 18, 2021

(54) DYNAMIC RADIATION COLLIMATION FOR NON DESTRUCTIVE ANALYSIS OF TEST OBJECTS

(71) Applicant: Illinois Tool Works Inc., Glenview, IL (US)

(72) Inventor: Brett A. Muehlhauser, Rogers, MN (US)

(73) Assignee: Illinois Tool Works Inc., Glenview, IL (US)

( * ) Notice: Subject to any disclaimer, the term of this patent is extended or adjusted under 35 U.S.C. 154(b) by 324 days.

(21) Appl. No.: 16/129,404

(22) Filed: Sep. 12, 2018

(65) Prior Publication Data

US 2020/0080946 A1    Mar. 12, 2020

(51) Int. Cl.
*G01N 23/00*     (2006.01)
*G01N 23/046*    (2018.01)

(52) U.S. Cl.
CPC ..... *G01N 23/046* (2013.01); *G01N 2223/316* (2013.01); *G01N 2223/419* (2013.01); *G01N 2223/5015* (2013.01)

(58) Field of Classification Search
CPC ..... G01N 2223/316; G01N 2223/3306; G01N 2223/419; G01N 2223/427; G01N 2223/5015; G01N 2223/66; G01N 23/046
See application file for complete search history.

(56) References Cited

U.S. PATENT DOCUMENTS

| | | | |
|---|---|---|---|
| 6,023,494 A | 2/2000 | Senzig et al. | |
| 6,728,334 B1 * | 4/2004 | Zhao | G01N 23/046 378/4 |

(Continued)

FOREIGN PATENT DOCUMENTS

| | | |
|---|---|---|
| EP | 2767236 A1 | 8/2014 |
| WO | 2005018415 A2 | 3/2005 |

OTHER PUBLICATIONS

International Search Report and Written Opinion of International Application No. PCT/US2019/047984, dated Jan. 13, 2020, 17 pages.

(Continued)

*Primary Examiner* — Dani Fox
(74) *Attorney, Agent, or Firm* — Shumaker & Sieffert, P.A.

(57) ABSTRACT

For each respective first-phase rotational position of a set of first-phase rotational positions, an imaging system may generate a respective first-phase image. The imaging system may determine, based on an identified region of interest in the respective first-phase image, collimator blade positions for the respective first-phase rotational position. For each respective second-phase rotational position of a set of second-phase rotational positions, the imaging system may determine, based on the collimator blade positions for the first-phase rotational positions, collimator blade positions for the respective second-phase rotational position. The imaging system may generate a respective second-phase image in a second series of images while the test object is at the respective second-phase rotational position and while the collimator blades are at the collimator blade positions for the respective second-phase rotational position. The imaging system may compute, based on the second series of images, tomographic data for the portion of the test object.

17 Claims, 9 Drawing Sheets

(56) References Cited

U.S. PATENT DOCUMENTS

2011/0249795 A1 10/2011 Sugita et al.
2014/0177782 A1* 6/2014 Herold ................... A61B 6/032
378/4

OTHER PUBLICATIONS

McClelland, "Appendix E," X-Ray equipment operation Introduction to X-ray equipment operation, World Health Organization, Jul. 2004, 43 pp.

Christner, et al., "Dose Reduction in Helical CT: Dynamically Adjustable z-Axis X-Ray Beam Collimation," American Journal of Roentgenology, Jan. 2010, vol. 194, No. 1, pp. W49-W55.

Pearson, et al., "Dynamic intensity-weighted region of interest imaging for conebeam CT," J Xray Sci Technol. Mar. 2016, pp. 361-377.

Deak, et al., "Effects of Adaptive Section Collimation on Patient Radiation Dose in Multisection Spiral CT," RSNA, Radiology: vol. 252, No. 1, Jul. 2009, pp. 140-147.

* cited by examiner

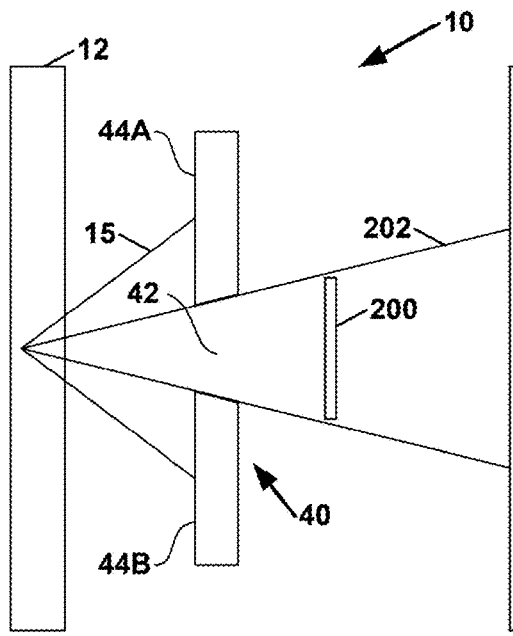 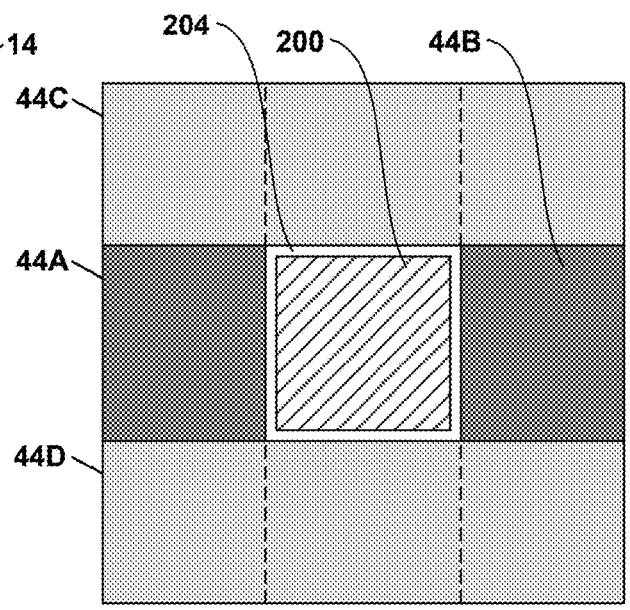
FIG. 2A   FIG. 2B
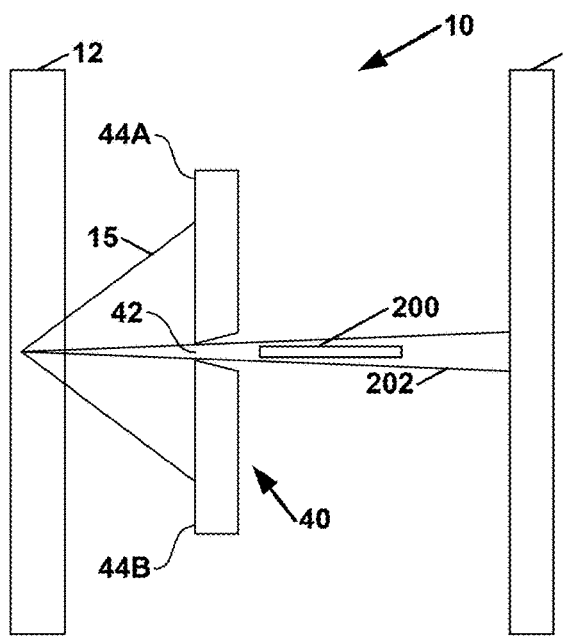 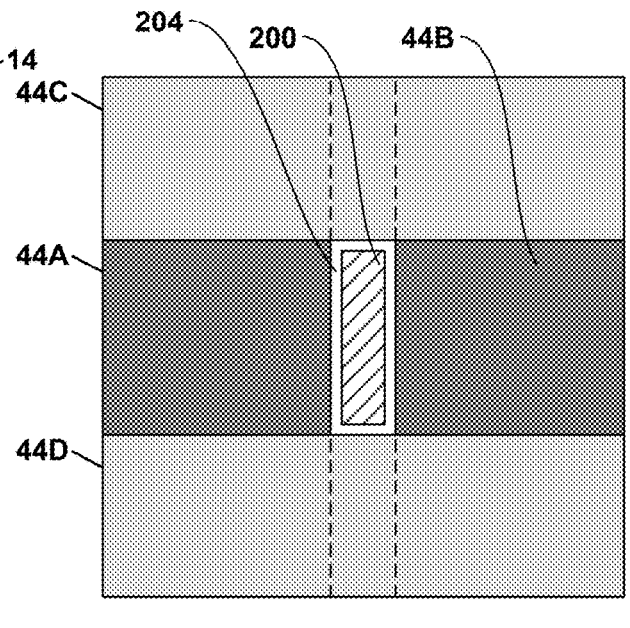
FIG. 2C   FIG. 2D

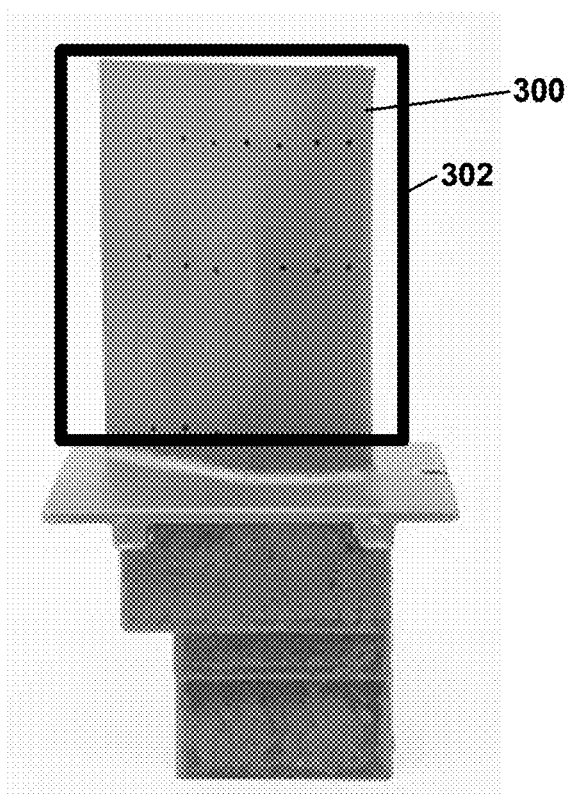 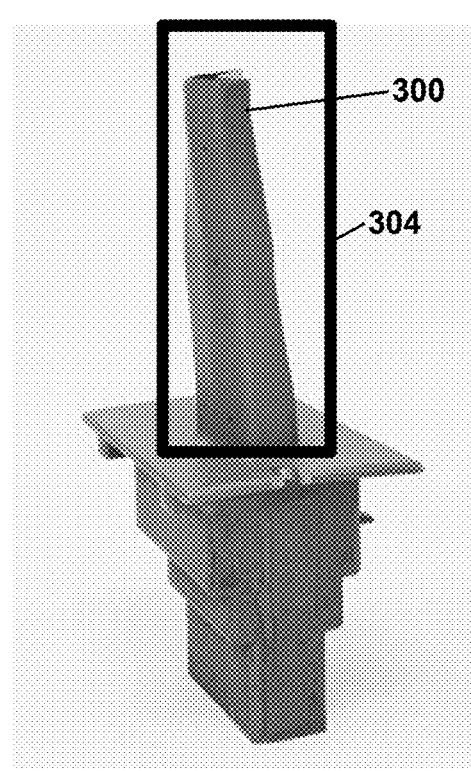
FIG. 3A          FIG. 3B

DYNAMIC RADIATION COLLIMATION FOR NON DESTRUCTIVE ANALYSIS OF TEST OBJECTS

TECHNICAL FIELD

This disclosure relates to digital radiography and computed tomography.

BACKGROUND

X-ray digital radiography (DR) is a commonly used non-invasive and non-destructive imaging technique using digital x-ray detectors, such as flat-panel detectors, charge-coupled device (CCD) cameras, or complementary metal-oxide-semiconductor (CMOS) cameras, or linear diode arrays (LDAs). X-ray computed tomography (CT) is a procedure that uses computer-processed x-ray radiographic images or sinograms acquired at different view angles to produce 3-dimensional (3D) data and 2-dimensional (2D) images of an object. A tomographic image of an object is an image of a conceptually two-dimensional "slice" of the object, which may be generated from radiographic images or sinograms. A computing device may use the tomographic images, radiographic images, or sinograms of the object to generate 3-dimensional data for the object, such as a 3-dimensional model of the object. X-ray CT may be used for industrial purposes to conduct non-destructive evaluation of objects.

SUMMARY

In one example, this disclosure describes a method for generating tomographic data of a test object, the method comprising: for each respective first-phase rotational position of a set of two or more first-phase rotational positions: generating, by an imaging system, a respective first-phase image in a first series of images, the respective first-phase image being generated while the test object is at the respective first-phase rotational position; identifying, by the imaging system, a region of interest (ROI) in the respective first-phase image, the ROI corresponding to a portion of the test object being evaluated; and determining, by the imaging system, based on the identified ROI in the respective first-phase image, collimator blade positions for the respective first-phase rotational position, wherein radiation is emitted by a radiation generator and passes through an aperture of a collimator, the collimator is positioned between the radiation generator and a radiation detector, the test object is positioned between the radiation generator and the radiation detector, and the collimator comprises a plurality of collimator blades that are movable to change a size and shape of the aperture of the collimator; for each respective second-phase rotational position of a set of two or more second-phase rotational positions: determining, by the imaging system, based on the collimator blade positions for the first-phase rotational positions, collimator blade positions for the respective second-phase rotational position; and generating, by the imaging system, a respective second-phase image in a second series of images, the respective second-phase image being a radiograph generated based on patterns of radiation detected by the radiation detector while the test object is at the respective second-phase rotational position and while the collimator blades are at the collimator blade positions for the respective second-phase rotational position; and computing, by the imaging system, based on the second series of images, the tomographic data for the portion of the test object being evaluated.

In another example, this disclosure describes an imaging system comprising: a radiation generator; a radiation detector; a collimator, wherein radiation emitted by the radiation generator passes through an aperture of the collimator, the collimator is positioned between the radiation generator and the radiation detector, a test object is positioned between the radiation generator and the radiation detector, and the collimator comprises a plurality of collimator blades that are movable to change a size and shape of the aperture of the collimator; and a processing system configured to: for each respective first-phase rotational position of a set of two or more first-phase rotational positions: generate a respective first-phase image in a first series of images, the respective first-phase image being generated while the test object is at the respective first-phase rotational position; identify a region of interest (ROI) in the respective first-phase image, the ROI corresponding to a portion of the test object being evaluated; and determine, based on the identified ROI in the respective first-phase image, collimator blade positions for the respective first-phase rotational position; for each respective second-phase rotational position of a set of two or more second-phase rotational positions: determine, based on the collimator blade positions for the first-phase rotational positions, collimator blade positions for the respective second-phase rotational position; and generate a respective second-phase image in a second series of images, the respective second-phase image being a radiograph generated based on patterns of radiation detected by the radiation detector while the test object is at the respective second-phase rotational position and while the collimator blades are at the collimator blade positions for the respective second-phase rotational position; and compute, based on the second series of images, tomographic data for the portion of the test object being evaluated.

In another example, this disclosure describes A non-transitory computer-readable storage medium having instructions stored thereon that, when executed, cause one or more processors to, for each respective first-phase rotational position of a set of two or more first-phase rotational positions: generate a respective first-phase image in a first series of images, the respective first-phase image being generated while a test object is at the respective first-phase rotational position; identify a region of interest (ROI) in the respective first-phase image, the ROI corresponding to a portion of the test object being evaluated; and determine, based on the identified ROI in the respective first-phase image, collimator blade positions for the respective first-phase rotational position, wherein radiation is emitted by a radiation generator and passes through an aperture of a collimator, the collimator is positioned between the radiation generator and a radiation detector, the test object is positioned between the radiation generator and the radiation detector, and the collimator comprises a plurality of collimator blades that are movable to change a size and shape of the aperture of the collimator; for each respective second-phase rotational position of a set of two or more second-phase rotational positions: determine, based on the collimator blade positions for the first-phase rotational positions, collimator blade positions for the respective second-phase rotational position; and generate a respective second-phase image in a second series of images, the respective second-phase image being a radiograph generated based on patterns of radiation detected by the radiation detector while the test object is at the respective second-phase rotational position and while the collimator blades are at the collimator blade positions for the respective second-phase rotational position; and compute, based on the second series of images, the tomographic data for the portion of the test object being evaluated.

The details of one or more examples are set forth in the accompanying drawings and the description below. Other features, objects, and advantages will be apparent from the description, drawings, and claims.

BRIEF DESCRIPTION OF DRAWINGS

FIG. 2A is a conceptual drawing of an example imaging system when a test object is at a first rotational position during the second scanning phase, in accordance with one or more techniques of this disclosure.

FIG. 2B is a conceptual drawing of example positions of blades of a collimator when the test object is at the first rotational position as shown in FIG. 2A.

FIG. 2C is a conceptual drawing of an example imaging system when a test object is at a second rotational position during the second scanning phase, in accordance with one or more techniques of this disclosure.

FIG. 2D is a conceptual drawing of example positions of blades of a collimator when the test object is at the second rotational position as shown in FIG. 2C.

FIG. 3A illustrates a first example test object at a first rotational position.

FIG. 3B illustrates the test object of FIG. 3A at a second rotational position different from the first rotational position.

DETAILED DESCRIPTION

Figure 1:
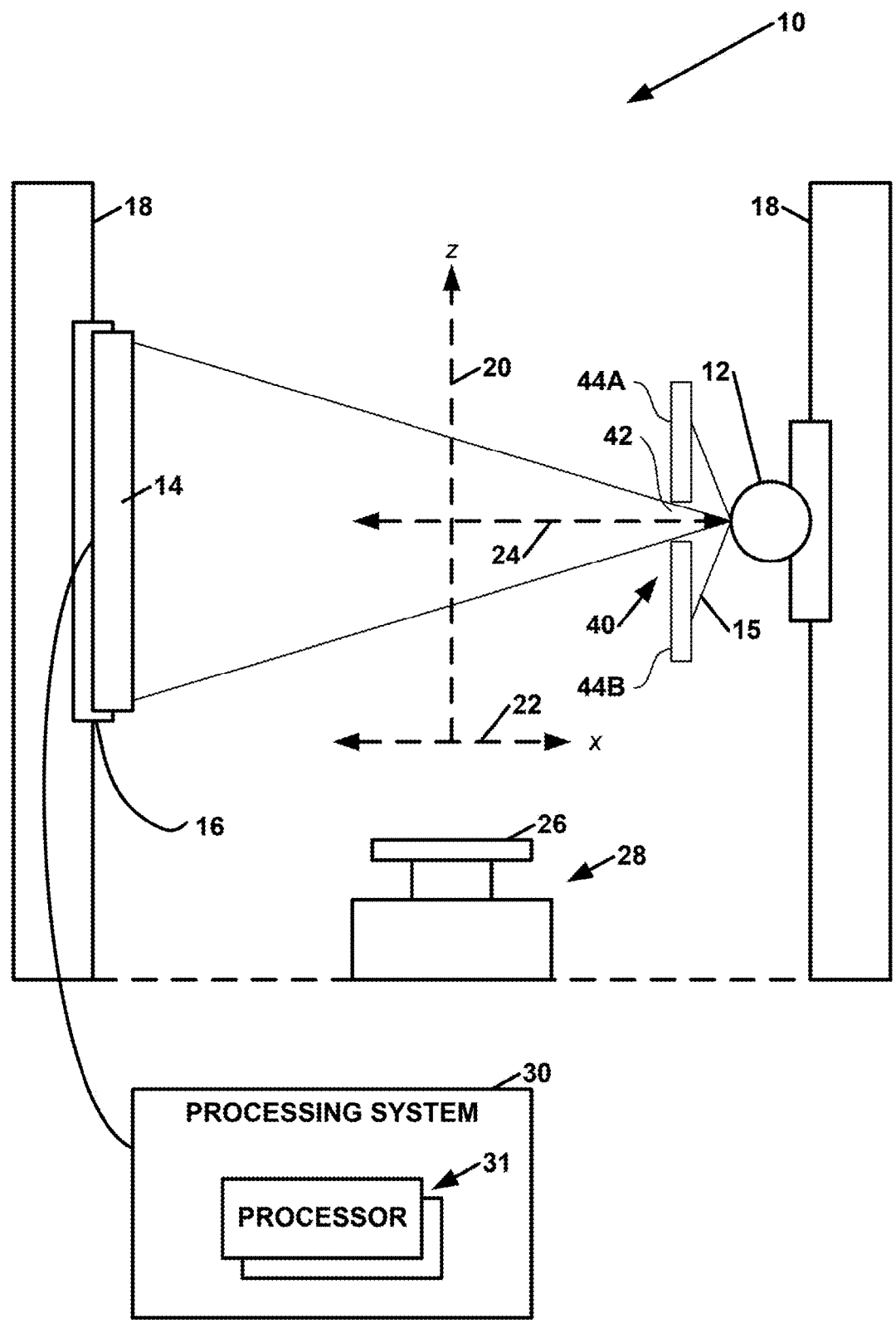
FIG. 1 is a schematic drawing of an example imaging system, in accordance with one or more techniques of this disclosure.

In general, this disclosure relates to dynamic collimation in computed tomography. In a typical x-ray imaging system, the x-ray imaging system includes a radiation detector and a radiation generator. The radiation detector detects x-rays generated by the radiation generator and outputs electrical signals corresponding to a pattern of detected x-rays. A test object being evaluated is positioned between the radiation detector and the radiation generator. The test object attenuates the x-rays in a characteristic way, resulting in the pattern of x-rays detected by the radiation detector. A processing system of the x-ray imaging system generates an image, such as a radiograph, based on the electrical signals output by the radiation detector.

By rotating the test object, the x-ray imaging system may generate a set of radiographs for various rotation positions of the test object or a sinogram of the object. The processing system may generate computed tomography (CT) data based on the set of radiographs or sinograms generated in this manner. In this way, the x-ray imaging system can be used for x-ray radiography and CT. X-ray radiography and CT are methods of non-invasively or non-destructively obtaining 2-dimensional (2D) and 3-dimensional (3D) data in medical imaging and industrial non-destructive evaluation (NDE).

One problem associated with x-ray imaging systems of the type described above is that x-rays not passing directly through a test object may scatter off the test object being evaluated and various parts of the x-ray imaging system and may reflect onto portions of the radiation detector corresponding to the region of interest. For instance, x-rays may reflect off the walls of a chamber that contains the test object and the radiation detector. This may result in decreased contrast in the resulting radiographs. Decreased contrast may make it more difficult to accurately interpret radiographs and CT data sets and may make it more difficult to compute quality tomographic data for the test object.

Thus, when performing digital radiography and CT, it is understood that beam collimation can be used to improve the contrast of an image and reduce imaging artifacts due to the reduction of scatter radiation. Collimation is usually applied to the cone of radiation, restricting the cone of radiation to the outer geometry of a test object or a specific area of interest within the test object. Typical system collimators provide a means for providing static, non-dynamic collimation while performing CT scans. The collimation is set once to create an opening size that will align with the maximum dimension of a test object's area of interest (AOI) that is projected onto a radiation detector. During a CT scan of an asymmetrical test object, the test object is rotated in front of the static collimated x-ray beam, a non-optimal collimation may occur in all areas of the test object where the area of interest dimensions is less than the above maximum AOI dimension.

In accordance with a technique of this disclosure, a collimator is positioned between the radiation generator and the radiation detector. For instance, in some examples, the collimator may be positioned between the radiation generator and the test object. In some examples, the collimator is positioned between the radiation detector and the test object. The collimator may include one or more blades of an x-ray shielding material, such as lead or tungsten. X-rays emitted by the radiation generator may pass through a gap between the blades of the collimator. This gap may be referred to as an aperture of the collimator. The collimator may block or attenuate x-rays not passing through the aperture of the collimator. In accordance with a technique of this disclosure, the aperture may be resized based on an outline of the test object or a region of interest (ROI) of the test object as the test object rotates through various rotational positions. In this way, the collimator reduces the quantity of radiation to only that necessary to image the test object or the test object ROI. This reduction of radiation may reduce the amount of scattered x-ray radiation that can reach the radiation detector, thereby potentially increasing the contrast in the portions of the radiographs that correspond to the test object. This may improve the quality of resulting CT data based on the radiographs. Although this disclosure frequently refers to x-rays, other types of radiation may be used instead of x-rays, such as gamma rays.

Thus, in one example of this disclosure, an imaging system may perform a first scanning phase and a second scanning phase. During the first scanning phase, the imaging system uses a series of live or static images to identify ROIs in the images and uses the ROIs to determine collimator blade positions for a set of rotational positions (e.g., every 1 degree of a 360-degree rotation). During the second scanning phase, the imaging system may generate images while the collimator blades are at the determined collimator blade positions for the rotational positions. In some examples, the imaging system may complete the first scanning phase prior to starting the second scanning phase. In some examples, the imaging system interleaves the first scanning phase and the second scanning phase, such that the first and second scanning phases may be completed in a single rotation. In some examples, the imaging system may store the collimator blade positions determined based on the ROIs in the first phase images as a command and control program for use in performing second scanning phase without needing to repeat the first scanning phase for each individual test object.

More specifically, in some examples, the imaging system may generate a first series of two or more images during a first scanning phase for a test object. Accordingly, this disclosure may refer to images in the first series of images as first-phase images. The first series of images may be radiographs or another type of image. Each image in the first series of images may correspond to a different rotational position of the test object in a set of first-phase rotational positions. The set of first-phase rotational positions may be a plurality of rotational positions. Thus, for each respective rotational position of the set of first-phase rotational positions, a given image in the first series of images corresponds to the respective first-phase rotational position.

Furthermore, in this example, for each respective first-phase rotational position, the imaging system may identify a region of interest (ROI) in a first-phase image corresponding to the respective first-phase rotational position. The ROI corresponds to a portion of the test object, such as a particular part of the test object or the whole test object, to be evaluated. The imaging system also determines, based on the identified ROI in the first-phase image corresponding to the respective first-phase rotational position, collimator blade positions for the respective first-phase rotational position. In this example, radiation is emitted by a radiation generator and passes through an aperture of a collimator. The collimator is positioned between the radiation generator and the radiation detector. The test object is also positioned between the radiation generator and the radiation detector. The collimator includes a plurality of collimator blades that are movable to change a size and shape of the aperture of the collimator. In some examples, the imaging system may move each of the collimator blades independently.

Additionally, in this example, after determining the collimator blade positions for the first-phase rotational positions, the imaging system may determine, based on the collimator blade positions for the first-phase rotational positions, collimator blade positions for a set of second-phase rotational positions. The second-phase rotational positions may be the same as or different from the first-phase rotational positions. For each respective second-phase rotational position, the imaging system may generate a respective second-phase image in a second series of images. The imaging system may generate the respective second-phase image a radiograph based on patterns of radiation detected by a radiation detector while the test object is at the respective second-phase rotational position and while the collimator blades are at the collimator blade positions for the respective second-phase rotational position. A pattern of radiation is a spatial pattern of greater or lesser intensity of radiation as detected by the radiation detector. Each respective second-phase image in the second series of images may be a radiograph. In this example, the imaging system may compute, based on the second series of images, tomographic data of the portion of the test object being evaluated.

In this disclosure, ordinal terms such as "first," "second," "third," and so on, are not necessarily indicators of positions within an order, but rather may simply be used to distinguish different instances of the same thing. Examples provided in this disclosure may be used together, separately, or in various combinations.

FIG. 1 is a schematic drawing of an example imaging system 10, in accordance with one or more techniques of this disclosure. As shown in the example of FIG. 1, imaging system 10 may include a radiation generator 12 and a radiation detector 14. Although not shown in the example of FIG. 1, imaging system 10 may include one or more additional radiation generators and/or one or more additional radiation detectors. For example, imaging system 10 may include a mini/conventional focus high-energy tube as a first radiation generator and a microfocus tube as a second radiation generator. In some examples, imaging system 10 may include a flat panel detector as a first radiation detector and also include one or more linear diode array detectors. Radiation generator 12 may emit an x-ray beam 15. Hence, in some instances, this disclosure may refer to radiation generator 12 or similar devices as "radiation sources." In some examples, x-ray beam 15 is cone-shaped. In other examples, x-ray beam 15 is fan-shaped. In some examples, radiation generator 12 generates x-rays with an energy range of 20 keV to 600 keV. In other examples, radiation generator 12 generates x-rays in other energy ranges.

Radiation detector 14 detects x-rays generated by radiation generator 12 and outputs electrical signals corresponding to a pattern of detected x-rays. In some examples, radiation detector 14 is a 2-dimensional (2D) x-ray detector, such as a flat panel detector (FPD). In such examples, radiation detector 14 may comprise a 2-dimensional array of radiation-sensitive elements, such as photodiodes. In some examples, imaging system 10 comprises a lens-coupled scintillation detector, or another type of x-ray detector, in place of or in addition to the FPD. The FPD may include a layer of scintillation material, such as Cesium Iodide fabricated on amorphous silicon on a glass detector array. In some examples, the pixel size of the FPD may be in the range of approximately 25 micrometers to approximately 400 micrometers. In other examples, the pixel size of the FPD or other detector may be of other sizes either square or non-isotropic. Additionally, a surface of radiation detector 14 may be flat, curved or have another geometric shape for alignment with specific x-ray beam configurations.

In other examples, radiation detector 14 is a linear detector such as a linear diode array (LDA) x-ray detector. The LDA x-ray detector includes a 1-dimensional array of photodiodes. Each of the photodiodes corresponds to a different pixel. For instance, there may be a 1-to-1 relationship between photodiodes and pixels. In some examples, the pixel size of radiation detector 14 is in the range of approximately 25 micrometers to approximately 1000 micrometers. In other examples, the pixel size of radiation detector 14 may be of other sizes either square or non-isotropic. Additionally, a surface of radiation detector 14 may be flat, curved or have another geometric shape for alignment with specific x-ray beam configurations.

In the example of FIG. 1, radiation detector 14 is mounted to a detector carriage 16. Detector carriage 16 is mounted to a frame 18. In some examples, detector carriage 16 is able to move in a z-dimension 20 relative to frame 18. In another example, detector carriage 16 is able to move in a y-dimension (directly into and out of the page as shown in FIG. 1) or an x-dimension 22 relative to frame 18. Thus, in the example of FIG. 1, detector carriage 16 may move radiation detector 14 in a vertical direction, a horizontal direction, or a direction toward or away from radiation generator 12. In some examples, radiation generator 12 is mounted to a carriage configured to move radiation generator 12 in one or more of the x, y, or z dimensions. The x, y, and z dimensions may have any orientation in real space.

Radiation detector 14 may be aligned in the y-dimension and z-dimension 20 with radiation generator 12 when radiation detector 14 is in use. In the example of FIG. 1, x-dimension 22 is parallel to an axis 24 (i.e., an x-ray beam axis) between radiation generator 12 and radiation detector 14 when radiation detector 14 is in position to detect an x-ray beam generated by radiation generator 12. Furthermore, although the example of FIG. 1 shows radiation generator 12 and radiation detector 14 mounted to the same frame, radiation generator 12 and radiation detector 14 may, in other examples, be mounted to separate frames. Additionally, the separate frames may be mounted to a carriage providing movement in the x-dimension of either the radiation detector, the radiation generator or both. It will be understood that discussion of x-rays in this disclosure may, in some examples, be applicable to other forms of radiation, such as gamma rays, neutron beams, and visible light.

In the example of FIG. 1, imaging system 10 comprises a processing system 30. Processing system 30 may comprise a computing system. Example types of computing systems may include personal computers, server computers, mainframe computers, laptop computers, special-purpose computers, and so on. As shown in the example of FIG. 1, processing system 30 may include one or more processors 31. Each of processors 31 may comprise one or more digital signal processors (DSPs), general purpose microprocessors, application specific integrated circuits (ASICs), field programmable logic arrays (FPGAs), or other equivalent integrated or discrete logic circuitry. For ease of explanation, this disclosure may describe actions performed by one or more of processors 31 as being performed by processing system 30. Processing system 30, and hence processors 31, are operatively coupled to various components of imaging system 10 such that processors 31 are able to output electrical signals to such components and receive electrical signals from such components. Such electrical signals may represent commands, image data, status data, and so on. Although this disclosure discusses electrical signals and the example of FIG. 1 shows a cable connecting processing system 30 to a component in imaging system 10, such signals may be optical signals and/or wirelessly transmitted signals. In some examples, processing system 30 may receive data from and send data (e.g., commands) to various components of imaging system 10 via a communication network, such as the internet or a local area network.

When radiation detector 14 detects a pattern of x-rays emitted by radiation generator 12, radiation detector 14 may output electrical signals corresponding to the pattern of x-rays. Processing system 30 may interpret the electrical signals to generate one or more radiographs.

Imaging system 10 may comprise one or more manipulator mechanisms configured to move an object relative to radiation generator 12 and radiation detector 14. In some examples, one or more processors 31 of processing system 30 output signals to move the test object relative to radiation generator 12 and radiation detector 14. For instance, in the example of FIG. 1, an object may be mounted (or otherwise positioned) on a stage 26 disposed between radiation generator 12 and radiation detector 14. In the example of FIG. 1, stage 26 is mounted to a stage manipulation mechanism 28. Stage manipulation mechanism 28 may move stage 26 (and thus an object mounted on stage 26) parallel to z-dimension 20. Additionally, in some examples, stage manipulation mechanism 28 may move stage 26 (and thus an object mounted on stage 26) parallel to a y-dimension that is mutually orthogonal to x-dimension 22 and z-dimension 20. Thus, in the example of FIG. 1, the y-dimension is oriented directly into and out of the page. In some examples, stage manipulation mechanism 28 may concurrently move stage 26 (and thus an object mounted on stage 26) in z-dimension 20 and the y-dimension. Furthermore, in some examples, stage manipulation mechanism 28 may tilt stage 26.

Furthermore, in some examples, stage manipulation mechanism 28 rotates stage 26 with an axis of rotation parallel to z-dimension 20 (i.e., perpendicular to x-ray beam axis 24). Thus, stage 26 may be configured to carry and rotate an object. Consequently, imaging system 10 may acquire images, such as radiographs, at different projection angles (i.e., rotational positions) as the test object is rotated in an x-ray beam generated by radiation generator 12. In some examples, imaging system 10 acquires images at different rotation angles and processes the images to assemble the images into 3-dimensional data for the test object, such as a 3D model of the test object. Furthermore, in some examples, stage manipulation mechanism 28 rotates stage 26 while concurrently moving stage 26 linearly in z-dimension 20.

As shown in the example of FIG. 1, imaging system 10 may comprise a collimator 40 positioned between radiation generator 12 and radiation detector 14. An aperture 42 of collimator 40 permits a reduced x-ray beam to pass through collimator 40 on its way to radiation detector 14. As described herein, processing system 30 may dynamically adjust a size and shape of aperture 42 as a profile of a test object rotating on stage 26 changes. In some examples, imaging system 100 includes a system for moving collimator 40 as a whole.

In accordance with techniques of this disclosure, when dynamic collimation is applied throughout a CT scan, an optimal collimation may be provided throughout the entire scan by creating a dynamic collimation that follows the outer geometry of the test object or a specific area of interest within the test object. This improved collimation may improve the contrast sensitivity of the scan, which can provide an improvement in the viewing of subtle features and discontinuities within a test object, such as a product sample. In creating a dynamic collimation system, an outer perimeter of the test object can be identified by using a software tool to identify the edge of the test object using image pixel values while the test object is rotated. The software can then automatically create a corresponding positional program that links the collimator blade positions to each rotational position of stage 26. For instance, in some examples, the program comprises data that map a set of collimator blade positions to a set of rotational stage positions. In some examples, this program can be created manually by capturing collimation positions and rotational stage positions simultaneously and recording them in a command and control program. In some examples, processing system 30 may generate the program by capturing a sampling of collimator blade positions and rotational positions, calculating desired intermediate collimator blade positions for intermediate rotational positions, and recording intermediate collimator blade positions and intermediate rotational positions in a command and control program. In some examples, processing system 30 generates the program by capturing a sampling of collimator blade positions and rotational positions. Additionally, in this example, processing system 30 may determine one or more intermediate collimator blade positions for intermediate rotational positions and may also receive indications of user input for additional combinations of intermediate collimator blade positions and rotational positions. In this example, processing system 30 may include the determined and input intermediate collimator blade positions and rotational positions in the program.

To perform dynamic collimation, imaging system 10 may perform a first scanning phase and a second scanning phase. Imaging system 10 may perform the first scanning phase and the second scanning phase consecutively or in an interleaved manner. In the first scanning phase, processing system 30 may identify an outer perimeter of a test object or portion of the test object and use the identified outer perimeter to determine collimator blade positions for rotational positions used in the second scanning phase. Processing system 30 may generate a first series of images during the first scanning phase for a test object. This disclosure may refer to images in the first series of images as first-phase images. The first series of images includes a plurality of images. In some examples, processing system 30 may generate the first-phase images based on patterns of radiation detected by radiation detector 14. In some examples, the first-phase images are not used in generating CT data for the test object. In some examples, processing system 30 may generate the first-phase images based on signals from a camera separate from radiation detector 14 and the first-phase images may be visible light images. Each first-phase image may correspond to a different first-phase rotational position of the test object in a set of first-phase rotational positions. For example, the set if first-phase rotational positions may include positions where the test object is rotated 0°, 45°, 90°, 135°, 180°, 225°, 270°, and 315°. In another example, the first-phase rotational positions may include one position for each degree of a 360° rotation. During the first scanning phase, the collimator blades of collimator 40 may be at the same positions when the test object is at each of the first-phase rotational positions. In other words, in some examples, the collimator blades of collimator 40 do not move during the first scanning phase.

For each respective first-phase rotational position of the set of first-phase rotational positions, processing system 30 may automatically identify a ROI in the first-phase image corresponding to the respective first-phase rotational position. In one example, processing system 30 may identify the ROI in a first-phase image using an algorithm that starts with a bounding box that has a size equal to the first-phase image. In this example, processing system 30 may progressively shrink the bounding box from the left side, periodically checking whether the left boundary of the bounding box crosses an edge within the first-phase image. An edge is a point at which a discontinuity occurs in pixel values, typically corresponding to an actual edge of the test object or structure within the test object. Upon detecting an edge, processing system 30 may move the left boundary back to the left by several pixels (e.g., 10 pixels) to provide a so-called "air gap" around the test object on the left side. Processing system 30 may then stop the adjustment process for the left side of the bounding box. In this example, processing system 30 may repeat this process for one or more of the right, top, and bottom edges of the bounding box. In some examples, processing system 30 may move edges of the bounding box independently or may move two or more of the edges of the bounding box concurrently. The resulting bounding box outlines the ROI in the first-phase image.

In some examples, the ROI in an image is smaller than the part of the image corresponding to the test object. For example, the test object may include a part, such as weld or valve, that needs to be evaluated. In this example, processing system 30 may identify areas within the first-phase images that correspond to the part. In some examples, to identify the areas within the first-phase images that correspond to the part, a machine learning model may be first trained to recognize the part in other first-phase images of the same test object. In such examples, processing system 30 may then apply the machine learning model to identify the areas in the first-phase images corresponding to the part. Alternatively, or additionally, processing system 30 may receive indications of user input that identify an area within a first-phase image that corresponds to the part. In these examples, processing system 30 may determine how to modify the ROI based on the user input, known dimensions of the part, known information on the position of the part within the test object, a distance of radiation detector 14 from collimator 40, and a distance of radiation generator 12 from collimator 40. In some examples, processing system 30 may identify the ROI based on a Computer Assisted Design (CAD) model of the part combined with a model of imaging system 10 which also models the cone of radiation, radiation detector 14, the collimator blades 44 and the intersection of the cone of radiation with the ROI and the corresponding blade positions. This model may be used to program the collimation positions independent of other methods.

In some examples, imaging system 10 may perform the first scanning phase as part of a process of evaluating a test object. For instance, imaging system 10 may use first-phase images to generate tomographic data used for actual evaluation of the test object. In such examples, imaging system 10 may use the first-phase images to generate ROI data indicating the ROI. As described below, imaging system 10 may then use the generated ROI data in a control program for controlling positions of collimator blades 44 during evaluation of other test objects of the same type. Thus, in such examples, it may not be necessary for imaging system 10 to perform the first scanning phase again for each test object of the same type.

As mentioned above, radiation is emitted by radiation generator 12 and passes through an aperture 42 of collimator 40. In the example of FIG. 1, collimator 40 is positioned between radiation generator 12 and the test object. Furthermore, in the example of FIG. 1, the test object is positioned between collimator 40 and radiation detector 14. Collimator 40 includes a plurality of collimator blades 44A, 44B that are movable to change a size and shape of aperture 42 of collimator 40. For each respective first-phase rotational position, processing system 30 may determine, based on the identified ROI in the first-phase image for the respective first-phase rotational position, collimator blade positions for the respective first-phase rotational position. For example, processing system 30 may determine the collimator blade positions for the respective first-phase rotational position based on the size and position of the identified ROI in the first-phase image corresponding to the respective first-phase rotational position, and also based on the distance of collimator 40 from radiation detector 14 and the distance of collimator 40 from radiation generator 12. In some examples, processing system 30 may determine the collimator blade positions in part by using a lookup table or formula that maps ROI width to gap width between horizontal moving collimator blades; and a lookup table that maps ROI height to gap height between vertical moving collimator blades. Additionally, processing system 30 may determine the collimator blade positions in part by using a lookup table or formula that maps a top (or bottom) edge of the ROI to a position of an upper (or lower) collimator blade; processing system 30 may also use a lookup table or formula that maps a left (or right) edge of the ROI to a position of a left (or right) collimator blade. Based on the gap widths and the positions of the upper (or lower) and left (or right) collimator blades, processing system 30 may determine the positions of all four collimator blades of collimator 40 for the respective rotational position. In this example, the lookup table or formula may be determined based on the factors such as the distance of collimator 40 from radiation detector 14 and the distance of collimator 40 from radiation generator 12.

Thus, as part of identifying the ROI in a first-phase image corresponding to a particular first-phase rotational position, processing system 30 may identify locations in the first-phase image that correspond to edges of a portion (e.g., a part or all) of the test object being evaluated. For instance, processing system 30 may run a process that identifies pixels that correspond to edges of the portion of the test object. Additionally, processing system 30 may determine a rectangular bounding box that contains the identified locations. Furthermore, as part of determining collimator blade positions for a first-phase rotational position, processing system 30 may determine the collimator blade positions for the first-phase rotational position such that a projection of the edges of the aperture of collimator 40 into radiation detector 14 corresponds to the determined rectangular bounding box. The projection of the edges may be considered the silhouette of the edges as projected onto radiation detector 14. For instance, the silhouette may be formed by rays from radiation generator 12 that touch the edges and continue in straight lines to radiation detector 14. The bounding box corresponding to the projection of the edges may be a smallest bounding box that contains the projection, with an optional air gap on one or more sides. In another example, processing system 30 may use a machine learning model that is trained to identify bounding boxes around ROIs in images, such as radiographs.

Additionally, processing system 30 may determine collimator blade positions for a set of two or more second-phase rotational positions. The second-phase rotational positions may be the same as the first-phase rotational positions or different from the first-phase rotational positions. Thus, in some examples, the second-phase rotational positions include more or fewer rotational positions than the set of first-phase rotational positions. In some examples, the set of second-phase rotational positions includes one or more rotational positions that are not in the set of first-phase rotational positions. In examples where the second-phase rotational positions are the same as the first-phase rotational positions, processing system 30 may merely determine that the collimator blade positions for the second-phase rotational positions are the same as the collimator blade positions for the first-phase rotational positions.

In examples where a second-phase rotational position is not in the set of first-phase rotational positions, processing system 30 may use one or more formulas to determine collimator blade positions for the second-phase rotational position. For instance, if a second-phase rotational position is halfway between two first-phase rotational positions, processing system 30 may determine that the collimator blade positions for the second-phase rotational position are halfway between the collimator blade positions for the two first-phase rotational positions. In some examples, processing system 30 may use a non-linear approach to determine collimator blade positions for second-phase rotational positions. For instance, in such examples, processing system 30 may calculate the collimator blade positions for a second-phase rotational position based on an arc between collimator blade positions used for two first-phase rotational positions.

Furthermore, in the second scanning phase of the test object, imaging system 10 may generate a second series of images based on patterns of radiation detected by radiation detector 14. This disclosure may refer to images in the second series of images as second-phase images. The second series of images may include more, fewer, or the same number of images as the first series of images. Each respective second-phase image may be a radiograph and may correspond to a different rotational position in the set of second-phase rotational positions. In other words, for each respective second-phase rotational position of the set of second-phase rotational positions, imaging system 10 may generate a respective second-phase image in the second series of images. The respective second-phase image may be generated based on patterns of radiation detected by radiation detector 14 while the test object is at the respective second-phase rotational position and while collimator blades 44 are at the collimator blade positions for the respective second-phase rotational position. As part of generating the second series of images, processing system 30 may control positions of collimator blades 44 such that collimator blades 44 have the collimator blade positions determined for the second-phase rotational positions.

Because the shape and position of an ROI may change as the test object rotates, the shape and position of aperture 42 of collimator 40 may change during the second scanning phase as the test object rotates. Thus, the part of radiation detector 14 falling in the shadow of collimator 40 may change for each of the second-phase rotational positions, especially if the test object is asymmetrical in an axis of rotation for the first and second sets of rotational positions. As a result, the useful area of image data within each of the second-phase images may vary. The useful area of image data within a second-phase image corresponds to an area of radiation detector 14 not in the shadow of collimator 40 when the second-phase image was generated. The useful area of the image may include the full detector area or a sub-region of the detector area that corresponds to an ROI. In some examples, processing system 30 may replace pixels of a second-phase image that are outside the useful area (i.e., in the collimated region) of the second-phase image with replacement pixel. For instance, processing system 30 may replace the collimated region of the second-phase image with white or black pixels. In some examples, processing system 30 may apply cropping of image size to reduce storage size for potentially enhanced data transfer and reconstruction times. Processing system 30 may apply software routines to provide detector pixel positions of the varying ROIs of the cropped ROI radiographs.

In some examples, imaging system 10 generates each of the first-phase images prior to generating any of the second-phase images. For instance, in this example, imaging system 10 may generate the first-phase images while rotating the test object through a first full rotation and may generate the second-phase images while rotating the test object through a second full rotation. In other examples, imaging system 10 may generate the first-phase images and the second-phase images in an interleaved manner. Thus, in some such examples, imaging system 10 may generate all of the first-phase images and all of the second-phase images in a single rotation of test object. For example, imaging system 10 may generate a first-phase image while the test object is at a first rotational position, determine collimator blade positions for the first rotational position, set the collimator blades to the determined collimator blade positions for the first rotational position, generate a second-phase image while the test object is at the first rotational position, and then rotate the test object to a next rotational position. In this example, imaging system 10 may repeat these steps for the next rotational position (i.e., generate a first-phase image while the test object is at a second rotational position, determine collimator blade positions for the second rotational position, set the collimator blades to the determined collimator blade positions for the second rotational position, generate a second-phase image while the test object is in the second rotational position, and then rotate the test object to a next rotational position).

In this example, processing system 30 may compute, based on the second series of images, tomographic data for the portion of the test object being evaluated. Processing system 30 may compute the tomographic data in accordance with any known techniques for computing a tomographic data from a series of radiographs known in the art.

FIG. 2A is a conceptual drawing of an example imaging system 10 when a test object 200 is at a first rotational position during the second scanning phase, in accordance with one or more techniques of this disclosure. In the example of FIG. 2A, collimator 40 collimates the full x-ray beam 15. Furthermore, in the example of FIG. 2A, collimator blades 44A, 44B are positioned such that aperture 42 is wide enough for the outer edges of a collimated x-ray beam 202 that passes through aperture 42 to pass through a relatively small area (i.e., an "air gap") next to the outer edges of test object 200.

FIG. 2B is a conceptual drawing of example positions of blades of collimator 40 when test object 200 is at the first rotational position as shown in FIG. 2A. FIG. 2B is from a perspective of a central emission point of full x-ray beam 15 of FIG. 2A. In the example of FIG. 2B, collimator 40 has four collimator blades 44A, 44B, 44C, and 44D (collectively, "collimator blades 44"). Collimator blades 44C and 44D are not shown in the example of FIG. 2A because of the perspective of FIG. 2A. In the example of FIG. 2B, collimator blades 44A and 44B are oriented vertically and collimator blades 44C and 44D are oriented horizontally. Furthermore, in the example of FIG. 2B, collimator blades 44C and 44D are closer to radiation generator 12 than collimator blades 44A and 44B. Hence, in the example of FIG. 2A, collimator blades 44A and 44B are partially obscured by collimator blades 44C and 44D.

Collimator blades 44 are positioned such that an air gap 204 occurs along one or more sides of test object 200. Air gap 204 may allow x-rays passing through aperture 42 of collimator 40 to reach radiation detector 14 without passing through test object 200. In some examples, there is not an air gap on all sides of test object 200.

FIG. 2C is a conceptual drawing of an example imaging system when a test object is at a second rotational position during the second scanning phase, in accordance with one or more techniques of this disclosure. In the example of FIG. 2C, test object 200 is rotated 90° relative to the first rotational position of test object 200 as shown in FIG. 2A. In other examples, test object 200 may be rotated by different angles. Thus, a narrowest edge of test object 200 is facing toward radiation generator 12. Accordingly, collimator blades 44A, 44B are repositioned to decrease the size of aperture 42, thereby narrowing collimated x-ray beam 202.

FIG. 2D is a conceptual drawing of example positions of blades of collimator 40 when test object 200 is at the second rotational position as shown in FIG. 2C. FIG. 2D is from the same perspective as FIG. 2B. Because test object 200 has rotated, a narrower face of test object 200 is facing toward radiation generator 12. As shown in the example of FIG. 2D, collimator blades 44C and 44D remain in the same positions, but processing system 30 has moved collimator blades 44A and 44B closer to one another.

FIG. 3A illustrates a first example test object 300 at a first rotational position. FIG. 3B illustrates the test object 300 of FIG. 3A at a second rotational position different from the first rotational position. FIG. 3A and FIG. 3B show an example of a test object that has an asymmetric geometry that could benefit from dynamic collimation when performing CT scans. In the example of FIG. 3A, ROI 302 corresponds to a part of test object 300 that is smaller than test object 300. In the example of FIG. 3B, ROI 304 corresponds to the same part of test object 300. As shown in FIGS. 3A and 3B, the size and shape of the ROI may change from image to image as test object 300 rotates.

Figure 4C:
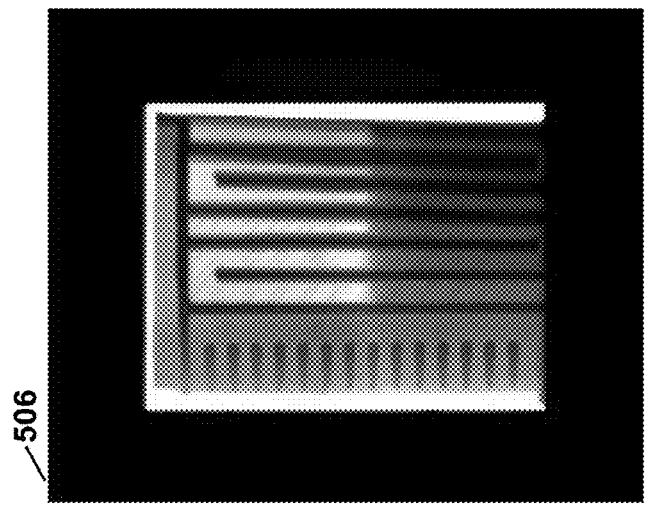
FIG. 4C illustrates an example radiograph of the test object of FIGS. 4A-4B with dynamic CT collimation at a 0-degree rotational position, in accordance with one or more techniques of this disclosure.
Figure 4B:
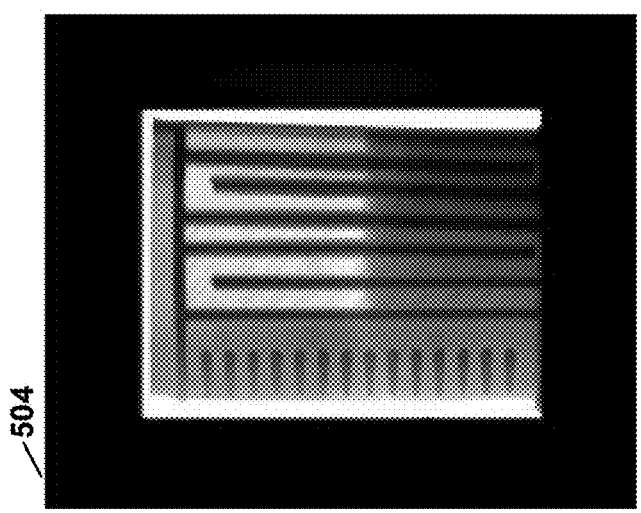
FIG. 4B illustrates an example radiograph of the test object of FIG. 4A with standard, non-dynamic computed tomography (CT) collimation at a 0-degree rotational position.
Figure 4A:
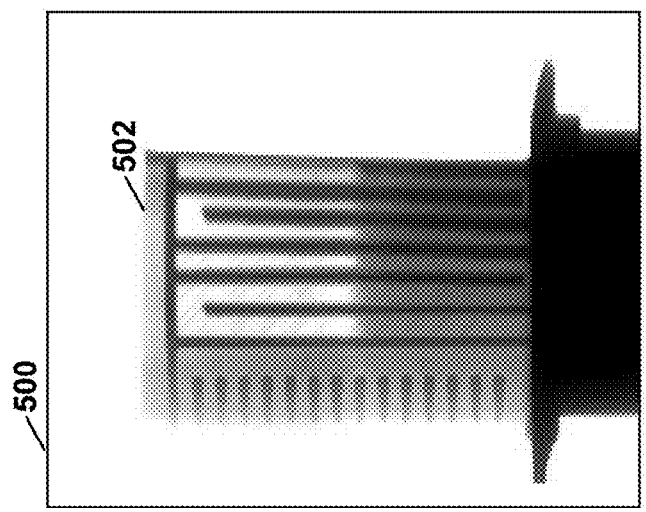
FIG. 4A illustrates an example radiograph of a test object with no collimation.
Figures 4D, 4E, 4F:
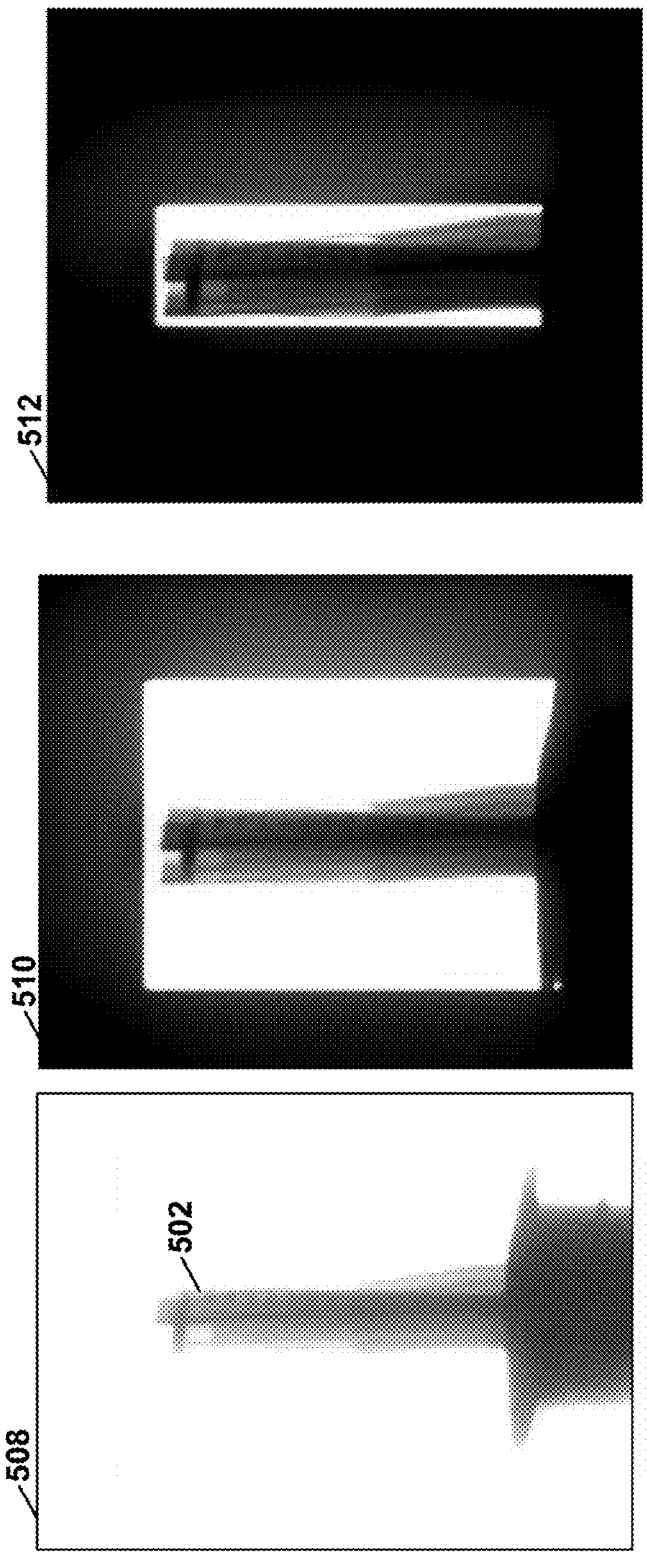
FIG. 4D illustrates an example radiograph of the test object of FIGS. 4A-4C with no collimation at a 90-degree rotational position.
FIG. 4E illustrates an example radiograph of the test object of FIGS. 4A-4D with standard, non-dynamic CT collimation at the 90-degree rotational position.
FIG. 4F illustrates an example radiograph of the test object of FIGS. 4A-4E with dynamic CT collimation at the 90-degree rotational position, in accordance with one or more techniques of this disclosure.

FIG. 4A illustrates an example radiograph 500 of a test object 502 with no collimation. In FIG. 4A, FIG. 4B, and FIG. 4C, the test object may be the test object 300 shown in FIG. 3A and FIG. 3B. FIG. 4B illustrates an example radiograph 504 of test object 502 of FIG. 4A with standard, non-dynamic CT collimation at a 0-degree rotational position. In other words, radiograph 504 is generated when the collimator blades are not changed based on the rotational position of test object 502. Thus, while the collimator blade positions used in radiograph 504 may be optimal in this 0-degree rotational position, when test object 502 is rotated 90°, significant space exists when test object 502 is in the 90-degree rotational position as shown in FIG. 4E. FIG. 4C illustrates an example radiograph 506 of the test object 502 of FIGS. 4A-4B with dynamic CT collimation at a 0-degree rotational position, in accordance with one or more techniques of this disclosure. The radiographs of FIG. 4B and FIG. 4C are the same because standard, non-dynamic collimation techniques position blades of a collimator based on a widest part of a test object in any rotational position of the test object. As shown in FIGS. 4A through 4C, the use of collimation results in radiographs 504 and 506 having better image contrast and test object radiographic edge definition than radiograph 500.

FIG. 4D illustrates an example radiograph 508 of the test object 502 of FIGS. 4A-4C with no collimation at a 90-degree rotational position. FIG. 4E illustrates an example radiograph of test object 502 of FIGS. 4A-4D with standard, non-dynamic CT collimation at the 90-degree rotational position. FIG. 4F illustrates an example radiograph of test object 502 of FIGS. 4A-4E with dynamic CT collimation at the 90-degree rotational position, in accordance with one or more techniques of this disclosure. The 90-degree rotational position is 90 degrees from the rotational position of test object 502 as shown in FIGS. 4A-4C. In the example of FIG. 4F, collimation has been continuously adjusted from the 0-degree maximum opening position to a 90-degree minimum position with an opening slightly larger than the smallest projected area of interest.

Because standard, non-dynamic collimation techniques do not adjust the positions of the collimator blades based on the rotational position of test object 502, the positions of the collimator blades are the same in FIG. 4B and FIG. 4E, despite the different rotational position of test object 502. However, in accordance with the dynamic collimation techniques of this disclosure, the collimator blades are repositioned based on the rotational position of test object 502 in radiograph 512. As one can see from FIGS. 4D, 4E, and 4F, the image contrast and test object radiographic edge definition in radiograph 510 is greater than the contrast in radiograph 508. However, the image contrast and test object radiographic edge definition are greater still in radiograph 512 than radiograph 510 because of the dynamically changed positions of the collimator blades. Additionally, the brightness of the ROIs in radiographs 508 and 510 may be greater and the edges of test object 502 may begin to be "washed out" in radiograph 510 when compared to when dynamic collimation is used in generating radiograph 512, even though the same exposure parameters are applied. The reduced brightness level of radiograph 512 and the increase in image contrast and test object radiographic edge definition is directly related to the reduction of scattered radiation through the application of dynamic collimation.

Figure 5:
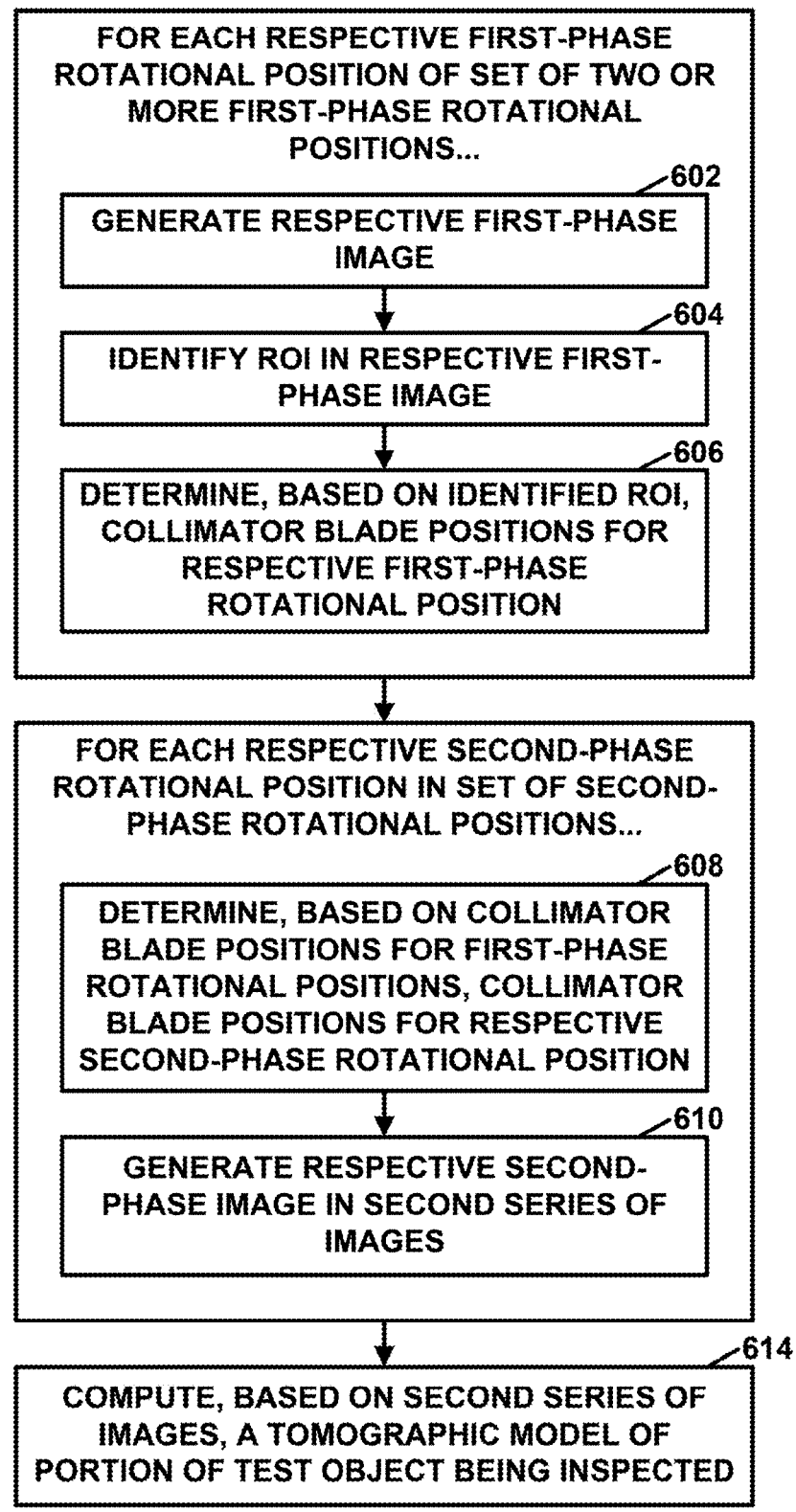
FIG. 5 is a flowchart illustrating a first example operation of an imaging system, in accordance with one or more techniques of this disclosure.

FIG. 5 is a flowchart illustrating a first example operation of imaging system 10, in accordance with one or more techniques of this disclosure. In other examples in accordance with the techniques of this disclosure, more, fewer, or different actions may be performed than shown in FIG. 5; or actions may be performed in different orders or in parallel.

In the example of FIG. 5, an imaging system (e.g., imaging system 10 of FIG. 1, imaging system 700 of FIG. 7, imaging system 800 of FIG. 8) may perform a first scanning phase for a test object (e.g., test object 200, 300, 502). During the first scanning phase, imaging system 10 may, for each respective first-phase rotational position of a set of two or more first-phase rotational position, generate a respective first-phase image in a first series of images (602). The respective first-phase image is generated while the test object is at the respective first-phase rotational position. In some examples, each image in the first series of images is a radiograph. In some examples, rather than being radiographs, the first series of images may include visible light photographs captured by secondary optical imaging components of imaging system 10. Each image in the first series of images may correspond to a different rotational position of the test object in the set of first-phase rotational positions.

Figure 7:
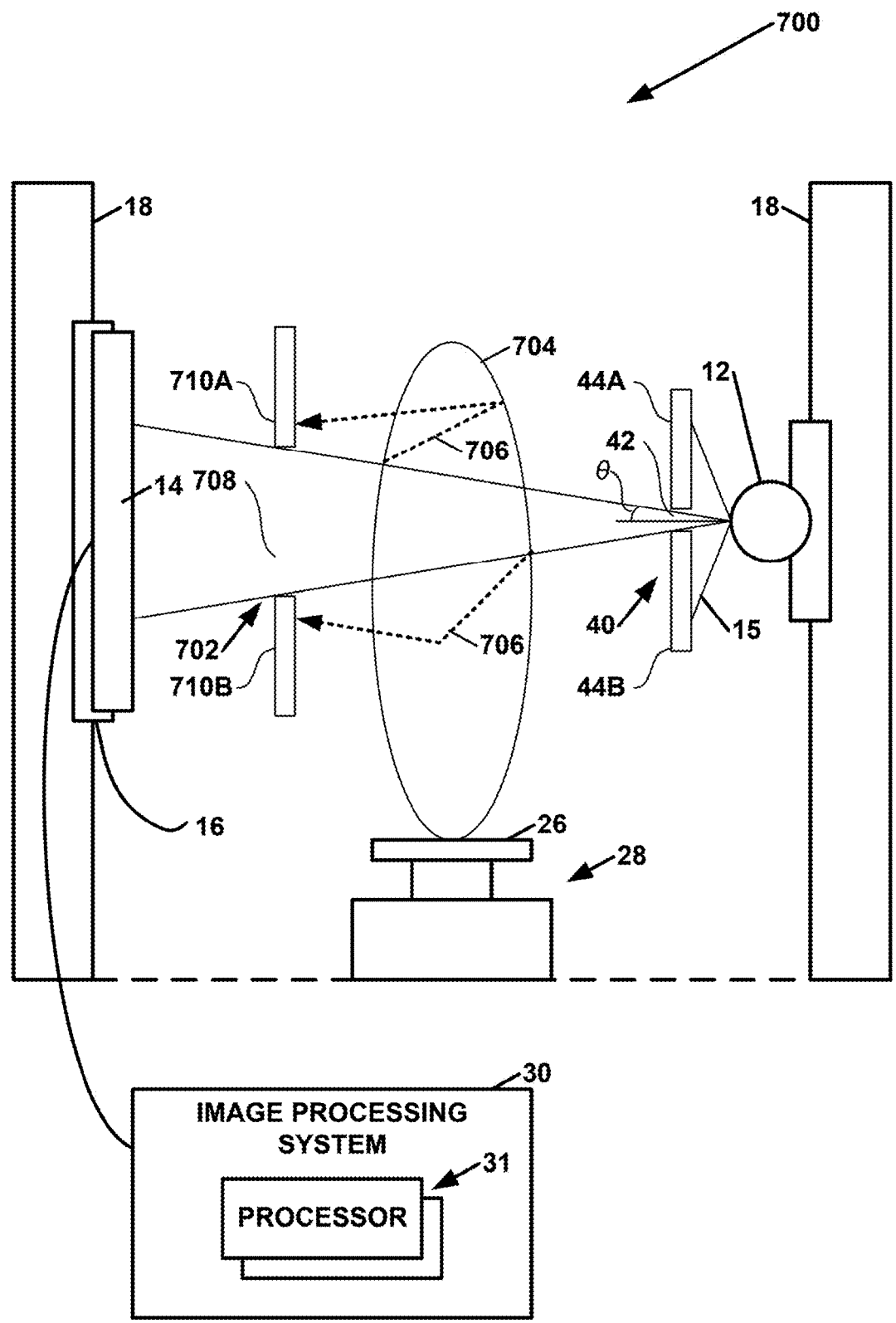
FIG. 7 is a schematic drawing of an example imaging system, in accordance with one or more techniques of this disclosure.

Furthermore, in the example of FIG. 7, for each respective first-phase rotational position of the set of first-phase rotational positions, the imaging system may identify a ROI (e.g., ROI 302, 304 (FIG. 3)) in the respective first-phase image (604). The ROI corresponds to a portion of the test object being evaluated. For instance, the ROI may correspond to a part of the test object or all of the test object. In some examples, processing system 30 automatically identifies the ROI as described elsewhere in this disclosure. For instance, processing system 30 may identify the ROI by tracking edges within the images.

Furthermore, for each respective first-phase rotational position of the set of first-phase rotational positions, the imaging system may determine, based on the identified ROI in the respective first-phase image, collimator blade positions for the respective first-phase rotational position (606). The imaging system may determine the collimator blade positions for the respective first-phase rotational position in accordance with any of the examples described elsewhere in this disclosure. Radiation is emitted by a radiation generator (e.g., radiation generator 12) and passes through an aperture of a collimator (e.g., collimator 40). The collimator is positioned between the radiation generator and the radiation detector. For instance, the collimator may be positioned between the radiation generator and the test object. The test object may be positioned between the collimator and the radiation detector. The collimator includes a plurality of collimator blades (e.g., collimator blades 44) that are movable to change a size and shape of the aperture of the collimator.

Furthermore, in the example of FIG. 5, for each respective second-phase rotational position in a set of two or more second-phase rotational positions, the imaging system may determine, based on the collimator blade positions for the first-phase rotational positions, collimator blade positions for the respective second-phase rotational position (608). In some examples, the set of first-phase rotational positions and the set of second-phase rotational positions consist of the same rotational positions. In other examples, the set of second-phase rotational positions includes more, fewer, or different rotational positions than the set of first-phase rotational positions. In some examples, the test object is asymmetric on an axis of rotation for the first-phase rotational positions and the second-phase rotational positions. Thus, the positions of the collimator blades may need to change as the test object rotates.

When the respective second-phase rotational position is the same as a first-phase rotational position in the set of first-phase rotational positions, the imaging system may determine that the collimator blade positions for the respective second-phase rotational position are the same as the collimator blade positions for the first-phase rotational position. When the respective second-phase rotational position is different from any first-phase rotational position in the set of first-phase rotational positions, the imaging system may determine the collimator blade positions for the respective second-phase rotational position based on the collimator blade positions for two or more of the first-phase rotational positions, as described elsewhere in this disclosure.

The imaging system may generate a respective second-phase image in a second series of images (610). The respective second-phase image is generated based on patterns of radiation detected by a radiation detector (e.g., radiation detector 14) while the test object is at the respective second-phase rotational position and while collimator blades are at the collimator blade positions for the respective second-phase rotational position. The respective second-phase image may be a radiograph. As part of generating the second-phase image, the imaging system may control positions of the collimator blades based on the collimator blade positions for the respective second-phase rotational position. To physically control the collimator blades, a processing system of the imaging system (e.g., processing system 30) may directly or indirectly send signals to motors that drive the collimator blades. As mentioned above, in some examples, the radiation detector may include an LDA x-ray detector. In such examples, it may only be necessary for the collimator to include two collimator blades configured to move in a direction perpendicular to the long axis of the LDA x-ray detector.

Subsequently, the imaging system may compute, based on the second series of images, the tomographic data for the portion of the test object being evaluated (614). The imaging system may compute the tomographic data according to any of the well-known techniques for computing tomographic data from a series of radiographs or sinograms known in the art such as, but not limited to filtered back projection (FBP), iterative reconstruction (IR) and Fourier reconstruction Furthermore, the examples provided above refer to the (e.g., collimator 40) as having a single aperture. However, in some examples, the collimator may have two or more apertures in a system with a single radiation generator 12 and single radiation detector 14. In such a system, each of the apertures may be used to evaluate a different test object concurrently. Processing system 30 may adjust the sizes and shapes of each of the apertures independently. In such examples, processing system 30 may be able to change the positions of each of the collimator blades independently. In other examples, two or more of the collimator blades may be linked for movement together.

In some examples, an imaging system (e.g., imaging system 10, 700, 800) may perform the operation of FIG. 5 automatically for one or more test objects without human intervention. In some such examples, a conveyor mechanism may automatically load test objects into the imaging system. Furthermore, in some examples where multiple test objects of the same type are to be evaluated, the imaging system may perform the first phase (i.e., actions (602), (604), and (606)) for one of the test objects (e.g., a first occurring test object) to determine the collimator blade positions for the first-phase rotational positions and to determine the collimator-blade positions for the second-phase rotational positions (608). In such examples, the imaging system may reuse the information about the collimator blade positions for the second-phase rotational positions to generate second-phase images of other ones of the test objects without repeating actions (602), (604), (606), and (608) for the other test objects. In some examples, the test object in question may be the same physical test object or two different physical test objects of the same type (e.g., same shape, dimensions, composition, etc.).

Figure 6:
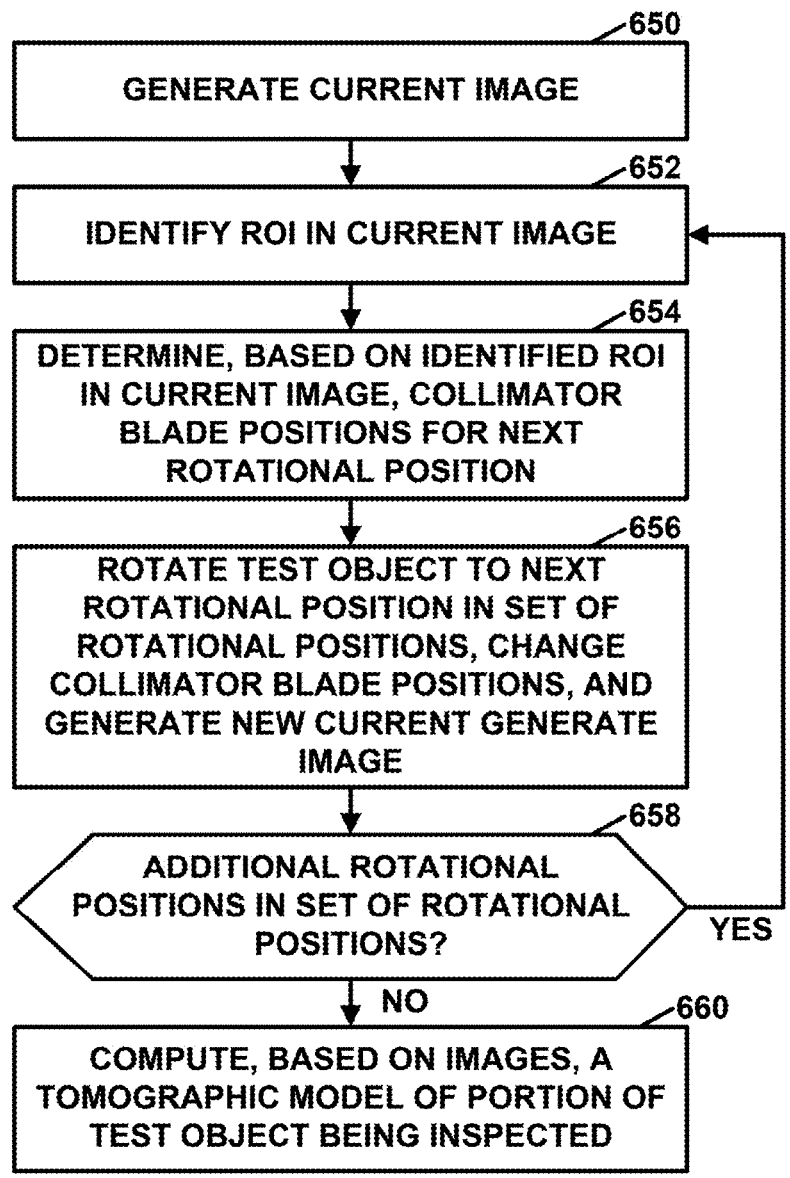
FIG. 6 is a flowchart illustrating a second example operation of an imaging system, in accordance with one or more techniques of this disclosure.

FIG. 6 is a flowchart illustrating a second example operation of imaging system 10, in accordance with one or more techniques of this disclosure. Unlike the example operation of FIG. 5, the operation of FIG. 6 may generate the images used to compute tomographic data in a single phase. In some examples, each of the images is a radiograph.

Particularly, in the example of FIG. 6, imaging system 10 may generate a current image (650). When the current image is the first-occurring image in a set of images used to compute the tomographic data, imaging system 10 may generate the current image while the test object is at a first-occurring rotational position in a set of rotational positions. In some examples, imaging system 10 may generate the first-occurring image while the aperture of the collimator is at its widest configuration.

Next, imaging system 10 may identify a ROI in the current image (652). As before, the ROI may correspond to a portion of the test object being evaluated, such as a part of the test object or all of the test object. In some examples, the boundaries of the ROI in the current image correspond to outer edges of the test object as shown in the current image, with an air gap of several pixels on one or more sides. In some examples, imaging system 10 automatically identifies the ROI as described in examples provided elsewhere in this disclosure. In some examples, rather than using the current image to identify the ROI in the current image, imaging system 10 may use information (e.g., dimensions of the test object) in a CAD file for the test object to determine the ROI.

In one example, after determining the ROI in the first-occurring image, imaging system 10 may determine collimator blade positions corresponding to the ROI in the first-occurring image. In this example, imaging system 10 may then change the positions of the collimator blades to correspond to the determined collimator blade positions. Furthermore, in this example, imaging system 10 may then regenerate the image for the first-occurring rotational position. In this example, imaging system 10 may use this regenerated image when computing the tomographic model of the portion of the test object.

In the example of FIG. 6, imaging system 10 may then determine, based on the identified ROI in the image, collimator blade positions for a next rotational position in the set of rotational positions (654). In some examples, to determine the collimator blade positions for the next rotational position, imaging system 10 may determine an expected ROI for the next rotational position. Imaging system 10 may determine the expected ROI for the next rotational position based on the size of the air gap in the current image. For example, for each side of a bounding box defining the ROI (or a side in a subset of the sides of the bounding box), if the air gap is less than a first threshold size (e.g., less than a given number of pixels), imaging system 10 moves the side outward relative to the test object. Conversely, if the air gap is greater than a second threshold size (e.g., greater than a given number of pixels), imaging system 10 moves the side inward relative to the test object. The first and second threshold sizes may be the same or different numbers. Moreover, in some examples, there are different first and second thresholds for different sides of the bounding box. In some examples, the amount by which imaging system 10 moves the side outward or inward may be a fixed number. In some examples, imaging system 10 may determine the amount by which imaging system 10 moves the side outward or inward based on the different in size of the air gap on the side in the previous two images. In some examples, imaging system 10 may determine the amount by which imaging system 10 moves the side outward or inward based on predefined data indicating dimensions of the test object and how many degrees of rotation fall between the current rotational position and the next rotational position. After determining the ROI for the next rotational position, imaging system 10 may determine the collimator blade positions for the next rotational position based on a mathematical relationship between the collimator blade positions and the location and size of the ROI for the next rotational position in the same manner described elsewhere in this disclosure.

Next, imaging system 10 may rotate the test object to the next rotational position in the set of rotational positions, change the positions of the collimator blades to the collimator blade positions for the next rotational position, and generate a new current image (656). Additionally, imaging system 10 may determine whether there are any additional rotational positions in the set of rotational positions (658). In response to determining that there are additional rotational positions in the set of rotational positions ("YES" branch of 658), imaging system 10 may repeat actions (652) through (658) with respect to the new current image. Otherwise, in response to determining that there are no additional rotational positions in the set of rotational positions ("NO"

branch of 658), imaging system 10 may compute, based on the images, a tomographic model of the portion of the test object being evaluated (660). Imaging system 10 may compute the tomographic model in the manner described elsewhere in this disclosure.

FIG. 7 is a schematic drawing of an example imaging system 700, in accordance with one or more techniques of this disclosure. In most respects, imaging system 700 is similar to imaging system 10 (FIG. 1). Thus, parts numbered in FIG. 7 with the same reference numbers as parts in FIG. 1 have the same functions and may be implemented in the same ways as those parts in FIG. 1.

In some examples, the test object itself may scatter x-rays that have passed through aperture 42 of collimator 40. The x-rays scattered within the test object may, in turn, reflect or scatter off other regions of the object or components of imaging system 700 before hitting radiation detector 14. Thus, the x-rays scattered off the test object may reduce contrast in any resulting radiographs.

Accordingly, in the example of FIG. 7, imaging system 700 is provided with a second collimator 702 that is positioned on the detector side of a test object 704 with collimator 702. Collimator 702 may be synced with the tube-side collimator 40 or may move and be controlled independently from tube-side collimator 40. Collimator 702 has a plurality of collimator blades, including collimator blades 710A, 710B. Other collimator blades of collimator 702 are not shown in the example of FIG. 7 because of the perspective of FIG. 7. In some examples, imaging system 700 may include a system for moving collimator 702 as a whole. This may be useful because, in some examples, it may be advantageous to keep a position of collimator 702 as close as possible to test object 704 while test object 704 rotates.

The secondary collimation shown in FIG. 7 may reduce scatter radiation 706 initiated by test object 704 that ends up in a region of interest on radiation detector 14. This secondary dynamic collimation may even further improve image contrast and test object radiographic edge definition through the reduction of this secondary test object scatter. Because collimator 702 may be synced with collimator 40, changes in the size, shape, and position of aperture 42 result in corresponding changes in the size, shape, and position of aperture 708 of collimator 702. For instance, if aperture 42 gets wider horizontally, aperture 708 also gets wider horizontally. In some examples, processing system 30 may determine an angle $\theta$ such that $\tan(\theta)$ is equal to ½ of width (or height) of aperture 42 divided by the distance from aperture 42 to radiation generator 12. In this example, processing system 30 may determine the width (or height) of aperture 708 as $2 \cdot \tan(\theta)*$(distance from aperture 708 to radiation generator 12). In other examples, processing system 30 may control the collimator blade positions of collimator 702 independently from the collimator blade positions of collimator 40.

Thus, the collimator mentioned in FIG. 5 may be considered a first collimator, the collimator blade positions for the respective second-phase rotational position may be considered first collimator blade positions for the respective second-phase rotational position. Furthermore, extending the operation of FIG. 5, imaging system 700 may, for each respective second-phase rotational position of the set of second-phase rotational positions, determine, based on the collimator blade positions for the first-phase rotational positions, second collimator blade positions for the respective second-phase rotational position. For instance, imaging system 700 may determine the second collimator blade positions for the respective second-phase rotation position as described in the previous paragraph. Additionally, continuing the operation of FIG. 5, imaging system 700 may generate the respective second-phase image based on the patterns of radiation detected by radiation detector 14 while the test object is at the respective second-phase rotational position, while the collimator blades of the first collimator (i.e., collimator 40) are at the first collimator blade positions for the respective second-phase rotational position, and while collimator blades 710 of the second collimator (i.e., collimator 702) are at the second collimator blade positions for the respective second-phase rotational position.

Figure 8:
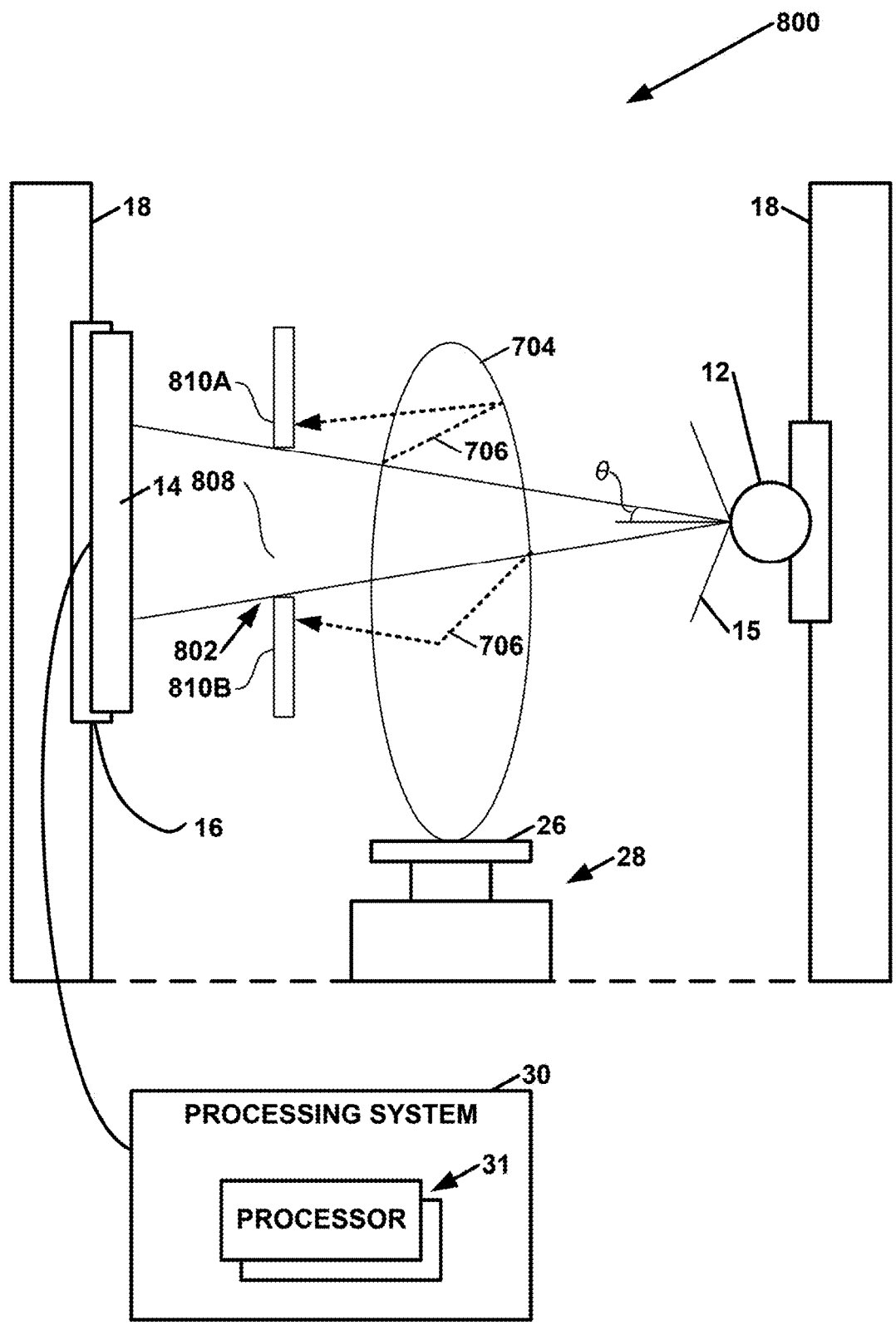
FIG. 8 is a schematic drawing of an example imaging system, in accordance with one or more techniques of this disclosure.

FIG. 8 is a schematic drawing of an example imaging system 800, in accordance with one or more techniques of this disclosure. In most respects, imaging system 800 is similar to imaging system 10 (FIG. 1) and imaging system 700 (FIG. 7). Thus, parts numbered in FIG. 8 with the same reference numbers as parts in FIG. 1 and FIG. 7 have the same functions and may be implemented in the same ways as those parts in FIG. 1 and FIG. 7.

In the example of FIG. 8, imaging system 800 is provided with collimator 802, which is positioned on the detector side of a test object 704 with collimator 802. In other words, collimator 802 is positioned between test object 704 and radiation detector 14. However, imaging system 800 does not include a collimator, such as collimator 40, positioned between test object 704 and radiation generator 12. Like collimator 702, collimator 802 has a plurality of collimator blades, including collimator blades 810A, 810B. Other collimator blades of collimator 802 are not shown in the example of FIG. 8 because of the perspective of FIG. 8. In some examples, imaging system 800 may include a system for moving collimator 802 as a whole. This may be useful because, in some examples, it may be advantageous to keep position collimator 802 as close as possible to test object 704. Collimator 802 may have benefits similar to those described above with respect to collimator 702 in FIG. 7.

Although the techniques of this disclosure have been described with reference to x-rays, the techniques of this disclosure may also be applicable to electromagnetic radiation at other wavelengths, such as visible light, microwaves, ultraviolet radiation, radio waves, infrared radiation, gamma rays, or other types of electromagnetic radiation.

The techniques of this disclosure may be implemented in a wide variety of devices or apparatuses. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

In one or more examples, particular functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, particular portions of the techniques may be implemented in one or more circuits or logic elements.

Various examples have been described. These and other examples are within the scope of the following claims.

What is claimed is:

1. A method for generating tomographic data of a test object, the method comprising:

for each respective first-phase rotational position of a set of two or more first-phase rotational positions:
generating, by an imaging system, a respective first-phase image in a first series of images, the respective first-phase image being generated while the test object is at the respective first-phase rotational position;
identifying, by the imaging system, a region of interest (ROI) in the respective first-phase image, the ROI corresponding to a portion of the test object being evaluated; and
determining, by the imaging system, based on the identified ROI in the respective first-phase image, collimator blade positions for the respective first-phase rotational position, wherein radiation is emitted by a radiation generator and passes through an aperture of a collimator, the collimator is positioned between a radiation detector and the test object and the test object is positioned between the collimator and the radiation generator, the test object is positioned between the radiation generator and the radiation detector, and the collimator comprises a plurality of collimator blades that are movable to change a size and shape of the aperture of the collimator;

for each respective second-phase rotational position of a set of two or more second-phase rotational positions:
determining, by the imaging system, based on the collimator blade positions for the first-phase rotational positions, collimator blade positions for the respective second-phase rotational position; and
generating, by the imaging system, a respective second-phase image in a second series of images, the respective second-phase image being a radiograph generated based on patterns of radiation detected by the radiation detector while the test object is at the respective second-phase rotational position and while the collimator blades are at the collimator blade positions for the respective second-phase rotational position; and computing, by the imaging system, based on the second series of images, the tomographic data for the portion of the test object being evaluated.

2. The method of claim 1, wherein the set of first-phase rotational positions and the set of second-phase rotational positions consist of the same rotational positions.

3. The method of claim 1, wherein:

identifying the ROI in the respective first-phase image comprises:
identifying, by the imaging system, locations in the respective first-phase image that correspond to edges of the portion of the test object being evaluated; and
determining, by the imaging system, a rectangular bounding box that contains the identified locations, and determining the collimator blade positions for the respective first-phase rotational position comprises determining, by the imaging system, the collimator blade positions for the respective first-phase rotational position such that a projection of edges of the aperture of the collimator into the radiation detector corresponds to the determined rectangular bounding box.

4. The method of claim 1, wherein determining the collimator blade positions for the respective second-phase rotational position comprises:

based on the respective second-phase rotational position being the same as a first-phase rotational position in the set of first-phase rotational positions, determining, by the imaging system, that the collimator blade positions for the respective second-phase rotational position are the same as the collimator blade positions for the first-phase rotational position; and based on the respective second-phase rotational position being different from any first-phase rotational position in the set of first-phase rotational positions, determining, by the imaging system, the collimator blade positions for the respective second-phase rotational position based on the collimator blade positions for two or more of the first-phase rotational positions.

5. The method of claim 1, wherein the test object is asymmetric on an axis of rotation for the first-phase rotational positions and the second-phase rotational positions.

6. The method of claim 1, wherein:
the collimator is a first collimator,
the collimator blade positions for the respective second-phase rotational position are first collimator blade positions for the respective second-phase rotational position,
a second collimator is positioned between the test object and the radiation generator,
the method further comprises, for each respective second-phase rotational position of the set of second-phase rotational positions, determining, by the imaging system, based on the collimator blade positions for the first-phase rotational positions, second collimator blade positions for the respective second-phase rotational position, and
generating the respective second-phase image comprises generating the respective second-phase image based on the patterns of radiation detected by the radiation detector while the test object is at the respective second-phase rotational position, while the collimator blades of the first collimator are at the first collimator blade positions for the respective second-phase rotational position, and while collimator blades of the second collimator are at the second collimator blade positions for the respective second-phase rotational position.

7. The method of claim 1, wherein each respective image in the first series of images is a radiograph.

8. An imaging system comprising:
a radiation generator;
a radiation detector;
a collimator, wherein radiation emitted by the radiation generator passes through an aperture of the collimator, the collimator is positioned between the radiation detector and a test object and the test object is positioned between the collimator and the radiation generator, the test object is positioned between the radiation generator and the radiation detector, and the collimator comprises a plurality of collimator blades that are movable to change a size and shape of the aperture of the collimator; and
a processing system configured to:
for each respective first-phase rotational position of a set of two or more first-phase rotational positions:
generate a respective first-phase image in a first series of images, the respective first-phase image being generated while the test object is at the respective first-phase rotational position;
identify a region of interest (ROI) in the respective first-phase image, the ROI corresponding to a portion of the test object being evaluated; and
determine, based on the identified ROI in the respective first-phase image, collimator blade positions for the respective first-phase rotational position;
for each respective second-phase rotational position of a set of two or more second-phase rotational positions:
determine, based on the collimator blade positions for the first-phase rotational positions, collimator blade positions for the respective second-phase rotational position; and
generate a respective second-phase image in a second series of images, the respective second-phase image being a radiograph generated based on patterns of radiation detected by the radiation detector while the test object is at the respective second-phase rotational position and while the collimator blades are at the collimator blade positions for the respective second-phase rotational position; and
compute, based on the second series of images, tomographic data for the portion of the test object being evaluated.

9. The imaging system of claim 8, wherein the set of first-phase rotational positions and the set of second-phase rotational positions consist of the same rotational positions.

10. The imaging system of claim 8, wherein:
the processing system is configured such that, as part of identifying the ROI in the respective first-phase image, the processing system:
identifies locations in the respective first-phase image that correspond to edges of the portion of the test object being evaluated; and
determines a rectangular bounding box that contains the identified locations, and
the processing system is configured such that, as part of determining the collimator blade positions for the respective first-phase rotational position, the processing system determines the collimator blade positions for the respective first-phase rotational position such that a projection of edges of the aperture of the collimator into the radiation detector corresponds to the determined rectangular bounding box.

11. The imaging system of claim 8, wherein the processing system is configured such that, as part of determining the collimator blade positions for the respective second-phase rotational position, the processing system:
based on the respective second-phase rotational position being the same as a first-phase rotational position in the set of first-phase rotational positions, determines that the collimator blade positions for the respective second-phase rotational position are the same as the collimator blade positions for the first-phase rotational position; and
based on the respective second-phase rotational position being different from any first-phase rotational position in the set of first-phase rotational positions, determine the collimator blade positions for the respective second-phase rotational position based on the collimator blade positions for two or more of the first-phase rotational positions.

12. The imaging system of claim 8,
the collimator is a first collimator,
the collimator blade positions for the respective second-phase rotational position are first collimator blade positions for the respective second-phase rotational position,
a second collimator is positioned between the test object and the radiation generator,
the processing system is further configured to, for each respective second-phase rotational position of the set of second-phase rotational positions, determine, based on the collimator blade positions for the first-phase rotational positions, second collimator blade positions for the respective second-phase rotational position, and
the processing system is configured to generate the respective second-phase image based on the patterns of radiation detected by the radiation detector while the test object is at the respective second-phase rotational position, while the collimator blades of the first collimator are at the first collimator blade positions for the respective second-phase rotational position, and while collimator blades of the second collimator are at the second collimator blade positions for the respective second-phase rotational position.

13. The imaging system of claim 8, wherein each respective image in the first series of images is a visible light image.

14. A non-transitory computer-readable storage medium having instructions stored thereon that, when executed, cause one or more processors to:
for each respective first-phase rotational position of a set of two or more first-phase rotational positions:
generate a respective first-phase image in a first series of images, the respective first-phase image being generated while a test object is at the respective first-phase rotational position;
identify a region of interest (ROI) in the respective first-phase image, the ROI corresponding to a portion of the test object being evaluated; and
determine, based on the identified ROI in the respective first-phase image, collimator blade positions for the respective first-phase rotational position, wherein radiation is emitted by a radiation generator and passes through an aperture of a collimator, the collimator is positioned between a radiation detector and the test object and the test object is positioned between the collimator and the radiation generator, the test object is positioned between the radiation generator and the radiation detector, and the collimator comprises a plurality of collimator blades that are movable to change a size and shape of the aperture of the collimator;
for each respective second-phase rotational position of a set of two or more second-phase rotational positions:
determine, based on the collimator blade positions for the first-phase rotational positions, collimator blade positions for the respective second-phase rotational position; and
generate a respective second-phase image in a second series of images, the respective second-phase image being a radiograph generated based on patterns of radiation detected by the radiation detector while the test object is at the respective second-phase rotational position and while the collimator blades are at the collimator blade positions for the respective second-phase rotational position; and
compute, based on the second series of images, the tomographic data for the portion of the test object being evaluated.

15. The non-transitory computer-readable medium of claim 14, wherein:
as part of causing the one or more processors to identify the ROI in the respective first-phase image, execution of the instructions causes the one or more processors to:
identify locations in the respective first-phase image that correspond to edges of the portion of the test object being evaluated; and
determine a rectangular bounding box that contains the identified locations, and as part of causing the one or more processors to determine the collimator blade positions for the respective first-phase rotational position, execution of the instructions causes the one or more processors to determine the collimator blade positions for the respective first-phase rotational position such that a projection of edges of the aperture of the collimator into the radiation detector corresponds to the determined rectangular bounding box.

16. The non-transitory computer-readable medium of claim 14, wherein as part of causing the one or more processors to determine the collimator blade positions for the respective second-phase rotational position, execution of the instructions causes the one or more processors to:
based on the respective second-phase rotational position being the same as a first-phase rotational position in the set of first-phase rotational positions, determine that the collimator blade positions for the respective second-phase rotational position are the same as the collimator blade positions for the first-phase rotational position; and
based on the respective second-phase rotational position being different from any first-phase rotational position in the set of first-phase rotational positions, determine the collimator blade positions for the respective second-phase rotational position based on the collimator blade positions for two or more of the first-phase rotational positions.

17. The non-transitory computer-readable medium of claim 14, wherein:
the collimator is a first collimator,
the collimator blade positions for the respective second-phase rotational position are first collimator blade positions for the respective second-phase rotational position,
a second collimator is positioned between the test object and the radiation generator,
execution of the instructions further causes the one or more processors to determine, for each respective second-phase rotational position of the set of second-phase rotational positions, based on the collimator blade positions for the first-phase rotational positions, second collimator blade positions for the respective second-phase rotational position; and
execution of the instructions causes the one or more processors to generate the respective second-phase image based on the patterns of radiation detected by the radiation detector while the test object is at the respective second-phase rotational position, while the collimator blades of the first collimator are at the first collimator blade positions for the respective second-phase rotational position, and while collimator blades of the second collimator are at the second collimator blade positions for the respective second-phase rotational position.

* * * * *